April 14, 1970  H. W. ANDERSEN ETAL  3,505,775
METHOD OF MANAGING A VOLATILE SUBSTANCE
Filed June 8, 1966  3 Sheets-Sheet 1
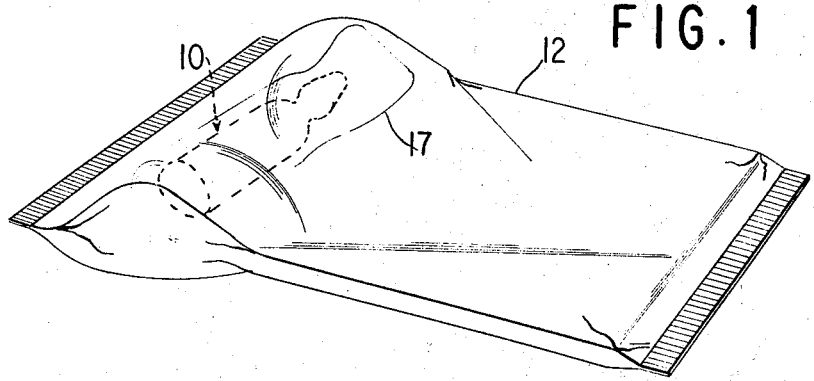
FIG.1
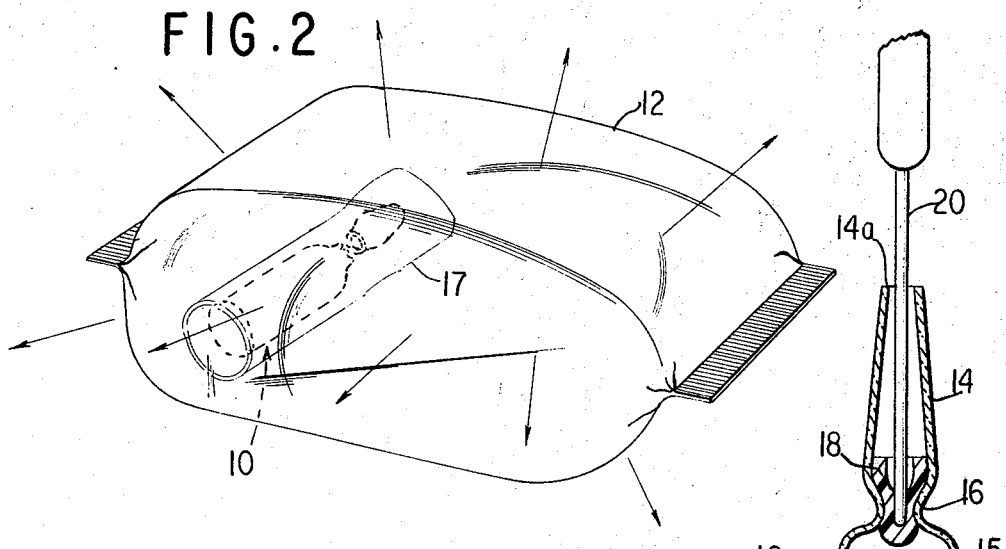
FIG.2
FIG.3
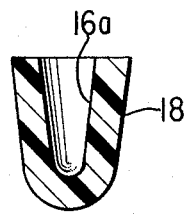
FIG.4
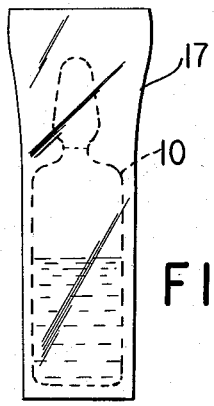
FIG.5
INVENTORS
Harold William Andersen
Harold W Andersen and
BY Charles H Harrison
ATTORNEYS

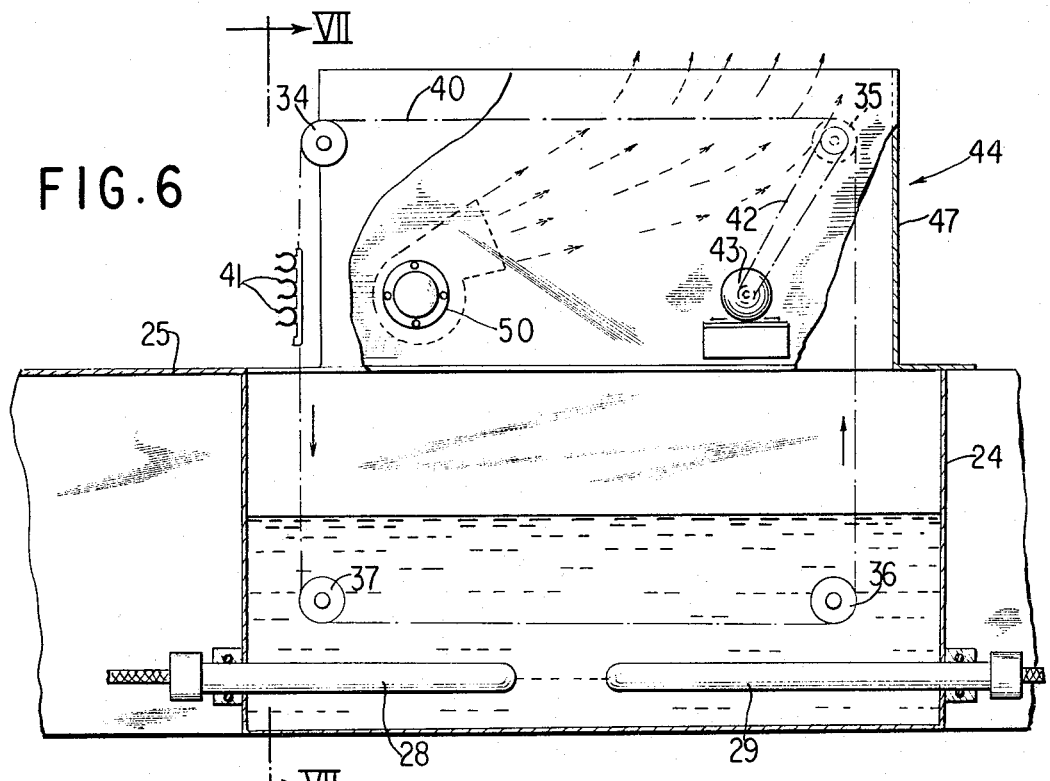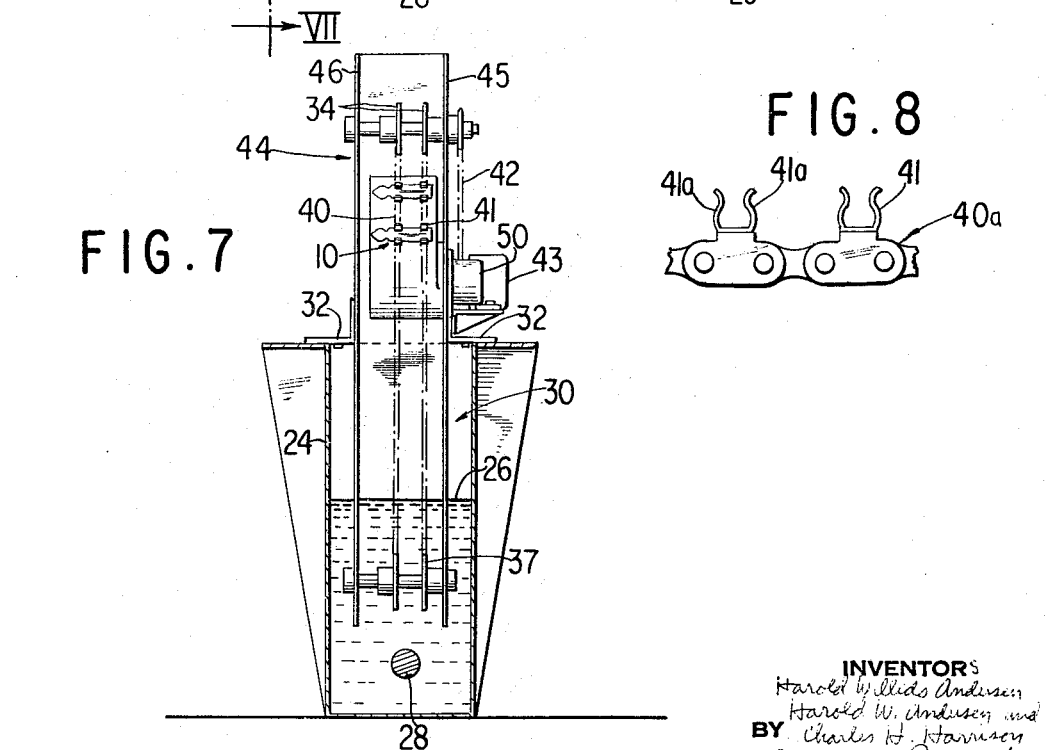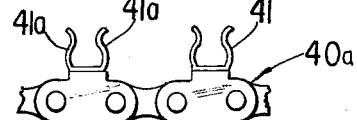

April 14, 1970  H. W. ANDERSEN ET AL  3,505,775

METHOD OF MANAGING A VOLATILE SUBSTANCE

Filed June 8, 1966  3 Sheets-Sheet 3

INVENTORS
Harold William Andersen,
Harold W. Andersen and
BY Charles H. Harrison
Brown & Seward
ATTORNEYS

United States Patent Office 3,505,775
Patented Apr. 14, 1970

3,505,775
METHOD OF MANAGING A VOLATILE SUBSTANCE
Harold Willids Andersen, Oyster Bay, Harold W. Andersen, Laurel Hollow, and Charles H. Harrison, Oyster Bay Cove, N.Y., assignors to H. W. Andersen Products, Inc., Oyster Bay, N.Y., a corporation of New York
Continuation-in-part of application Ser. No. 448,090, Apr. 14, 1965. This application June 8, 1966, Ser. No. 556,134
Int. Cl. A61j 5/00; A61l 9/04; B67c 7/00
U.S. Cl. 53—25                    9 Claims This is a continuation-in-part application of prior copending application Ser. No. 448,090, filed Apr. 14, 1965, now Patent No. 3,476,506, Nov. 4, 1969.

This invention relates to improvements to the invention disclosed in the aforesaid application and particularly to a method for controlling the release of volatiles, for example, sterilants such as ethylene oxide and anesthetics such as ethyl ether, vinyl ether and chloroform. The specific embodiments shown in the drawings relate to a method and apparatus for managing and controlling a sterilant up to the time it is released in gaseous form to effect sterilization, but, as already indicated, the principles are also applicable to controlling other volatiles such as anesthetics.

In one illustrated embodiment of our aforesaid prior application, a sterilant (e.g. ethylene oxide) is contained in a sealed ampule, the latter in turn being enclosed within a sealed plastic bag or the like. The instruments to be sterilized are placed in a second plastic bag or the like. The sterilant is released from the ampule to pass into the first bag and the latter is then placed in the second bag containing the instruments to be sterilized. Upon release of sterilant from the ampule, the inner sealed bag fills with gaseous sterilant, the latter passing through the semi-permeable walls of the inner bag into the second bag to sterilize the instruments therein. The second bag is also made of a semi-permeable material capable of passing the gaseous sterilant to the surrounding atmosphere at a controlled rate which maintains a concentration of gaseous sterilant in the second bag sufficient to sterilize the instruments and without releasing dangerous or harmful levels of gaseous sterilant to the surrounding atmosphere.

In order to control the release of sterilant from the ampule into the first bag, according to one embodiment of our aforesaid prior application, a mixture was formed by compounding the sterilant (e.g. ethylene oxide) with a substantially saturated hydrocarbon (e.g. polystyrene), the latter functioning to retard the release of ethylene oxide vapor from the mixture as compared to the release of ethylene oxide vapor from pure ethylene oxide in liquid form. The aforesaid mixture formed a gel which was placed in the ampule as the filling apparatus was maintained at a temperature below the boiling point of the sterilant. After the gel was placed in the ampule a stopper was seated in the neck of the ampule to serve as a vapor barrier as the spout of the ampule was heat sealed.

According to the present invention, the necessity of having to compound the sterilant with a hydrocarbon prior to filling the ampule is eliminated by providing a means for dissolving a substantially saturated hydrocarbon in the sterilant after the latter has been sealed in the ampule. This is accomplished, in one embodiment, by placing in the ampule along with the sterilant, a substantially saturated hydrocarbon in the form of a solid mass capable of dissolving in the sterilant (e.g. by applying heat) after the ampule has been sealed.

Accordingly, an object of the present invention is to provide a method for managing and controlling volatile substances which are ultimately released in gaseous form.

Another object is to provide for controlling (e.g. retarding) the release of volatiles from a non-gaseous to a gaseous form.

A further object is to provide, in one embodiment, for filling a container (e.g. ampule) with sterilant and after sealing the container, compounding the sterilant with a substance which will control the release of sterilant from the container when the sterilant is subsequently released during use.

A further object object is to provide, in the aforesaid embodiment, an arrangement to facilitate compounding the aforesaid control substance with the sterilant and for testing the integrity of the aforesaid container.

A further object is to provide certain improvements in the form, construction, arrangement, and material of the several elements wherein the above named and other objects may effectively be attained.

The aforesaid and other objects will become apparent as the description progresses. Practical embodiments of the invention are shown in the accompanying drawings wherein:

FIG. 1 is a perspective view of a sterilant ampule within a sealed enclosure or bag.

FIG. 2 is a perspective view of the bag shown in FIG. 1 after the sterilant has been released from the ampule.

FIG. 3 is an elevation, partly broken away and in section, of an ampule with a stopper being placed in the neck thereof.

FIG. 4 is a sectional view, on an enlarged scale, of the stopper for the ampule taken along a diametrical cutting plane.

FIG. 5 is an elevation of the ampule with its protective sleeve.

FIG. 6 is an elevation, partly broken away and in section, of apparatus for passing the ampules through a tank of liquid.

FIG. 7 is a sectional view taken along the cutting plane VII—VII of FIG. 6.

FIG. 8 is a partial view of the endless belt and clips for mounting the ampules.

Figure 9:
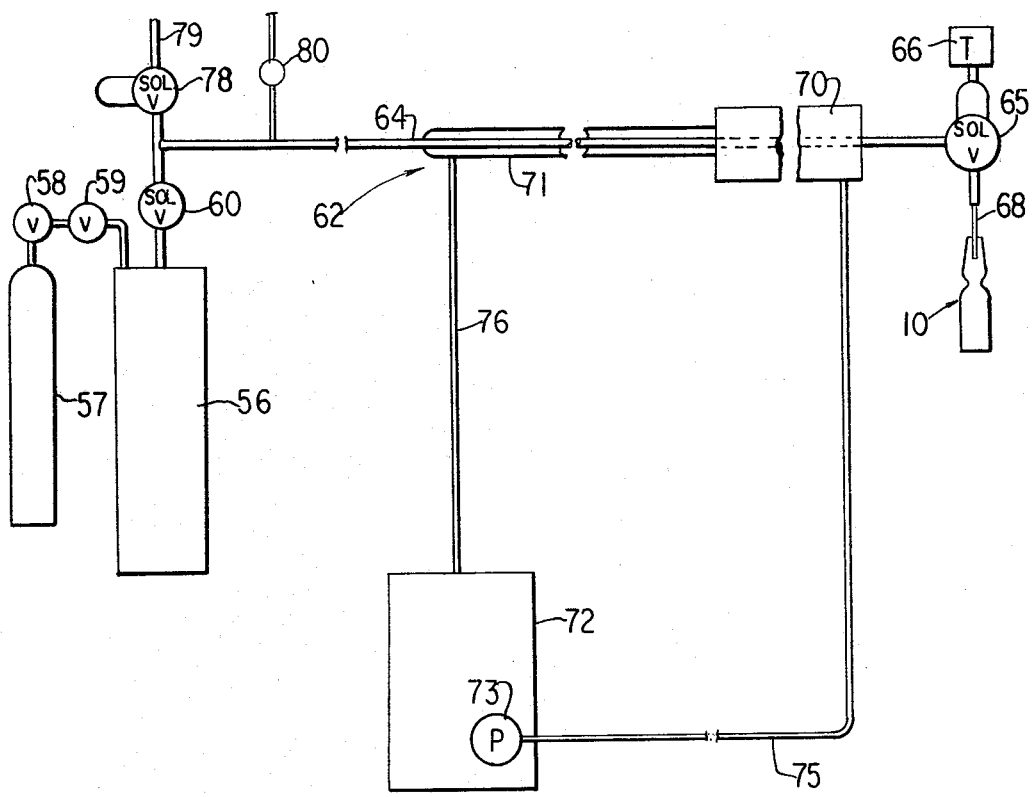
FIG. 9 is a schematic representation of the apparatus for filling the ampules with sterilant.

In the illustrated embodiment, a volatile sterilant will sometimes be referred to as ethylene oxide, however, it is to be understood that other volatile substances may be used.

With specific reference to the form of the invention illustrated in the drawings, and referring particularly to FIG. 1, there is shown a source of sterilant suitably contained as in an ampule 10, the latter in turn being disposed within an enclosure in the form of a bag 12. The enclosure or bag 12 is sealed and totally encloses the ampule 10 so that when sterilant is released from the ampule 10 in gaseous form, as will be later described, it will fill the bag 12 as shown in FIG. 2. As more fully described in our aforesaid prior application, the bag 12 containing the ampule 10 is placed within a second enclosure or outer bag (not shown) along with the instruments or items (not shown) to be sterilized. The release of sterilant from the ampule 10 fills the sealed bag 12 with gaseous sterilant, as shown in FIG. 2, and the gaseous sterilant diffuses through the walls of the bag 12 into the aforementioned outer bag (not shown) containing the instruments (not shown) to sterilize the latter. The bag 12, and also the aforesaid outer bag (not shown), are made of a semi-permeable material which allows the gaseous sterilant to pass therethrough at a rate which supplies a sufficient concentration within the outer bag (not shown) to sterilize the instruments and at a rate in which neither toxic nor explosive levels of the gaseous sterilant are reached in the surrounding atmosphere.

The ampule 10 is a sealed gas-tight container made from a material (e.g. glass) impervious to the sterilant. As shown in FIG. 3 the ampule 10 has an extended spout 14 joined to the main body 15 by a narrow neck 16. The ampule 10, initially provided with an open end 14a on the spout 14, is filled with sterilant to a predetermined level and thereafter, a closure member or stopper 18 is inserted and seated in the narrow neck 16. A hollow section 16a in the stopper 16, adapted to receive a rod-like tool 20, facilitates insertion and seating of the stopper 18 in the neck 16. With the stopper seated in the ampule (FIG. 3), the open end 14a of the spout 14 may be closed by heat sealing in a conventional manner as the stopper 16 serves as a vapor barrier between the volatile sterilant in the main section 15 of the ampule and the heat source applied adjacent the open end 14a of the spout for sealing the latter.

In this regard it is observed that ethylene oxide is a volatile liquid; it boils at approximately 50° F. and its vapor pressure at room temperature (68° F.) is 20 p.s.i. When mixed with air in concentrations of greater than approximately 30,000 parts per million, it is flammable and, if contained, it is explosive. Safety dictates, therefore, that ethylene oxide not be exposed to an open flame or a high temperature source of heat, and accordingly, the stopper 16, as mentioned above, isolates the ethylene oxide from the heat source used for sealing the ampule.

In use the ethylene oxide is released from the ampule 10 into the bag 12 by manually fracturing or breaking off the spout 14 of the glass ampule 10 along a score line performed around the narrow neck 16 of the ampule. Thus, it will be evident that it is a relatively simple operation to grasp the spout 14 of the ampule 10 with one hand, compress the bag 12 and a resilient sleeve 17 about the ampule 10, grasp the main body 15 of the ampule with the other hand, and cant the spou t14 and thereby break it off. The ampule is placed in the protective flexible sleeve 17 so that sharp edges or spikes of glass resulting from breaking off of the spout 14 will not puncture the bag 12. The sleeve 17 may be made of transparent plastic.

In order to provide greater flexibility in utilizing the sterilant for its intended function within the scope of this application, it is desirable to control (e.g. retard) the release rate of gaseous sterilant into the bag 12. If the release rate was too rapid for example, the bag might be ruptured or the sterilant might penetrate the walls of the bag 12 faster than desired. Thus if pure ethylene oxide were sealed in the ampule, its subsequent release in gaseous form into the bag 12 would tend to be quite rapid, to the point of affecting, in many cases adversely, such design criteria as the size, thickness, porosity, density and strength of the bag 12 and also the volume of liquid sterilant which can be used within the ampule 12 for a particular size bag 12. Retarding the release rate, therefore, provides greater flexibility in determining design criteria and also tends to extend the overall time during which the sterilant is released into and out of the bag 12.

In our aforesaid prior application the release of sterilant within the bag 12 was retarded by compounding the ethylene oxide with an essentially saturated hydrocarbon to form a gel, the ampule being filled with the gel while maintaining the filling apparatus below the boiling point of the sterilant. The present invention differs in that the plug 18 is made from an essentially saturated hydrocarbon (e.g. polyvinyl chloride), the latter being introduced by dissolving the plug 18 in the ethylene oxide, after the ampule 10 has been heat sealed. Thus the ampule 10 is initially filled with pure ethylene oxide, the plug 18 is seated, the spout 14 of the ampule is heat sealed while the plug serves as an effective vapor barrier, and finally the entire ampule is heated to completely dissolve the plug in the ethylene oxide.

The retardation in release rate is brought about because the dissolved hydrocarbon lowers the vapor pressure and hence increases the boiling point of the ethylene oxide. The vaporization of ethylene oxide from the surface of the sterilant cools said surface, hardening the sterilant mixture adjacent said surface to form a membrane thereon which further inhibits release.

The means for heating the ampule to dissolve the plug may comprise apparatus as shown in FIGS. 6 to 7 wherein an open top tank 24 mounts a work bench 25 therearound. Water 26 within the tank 24 is heated and maintained at the desired temperature (e.g. 165° F. average) required to dissolve the plug 18. The heating may be accomplished by the electrical heaters 28 and 29. The tank 24 has an open top for receiving a frame structure 30, the latter being suspended in the tank 24 as by the brackets 32. The frame structure 30 mounts four pulleys 34, 35, 36, 37 which carry an endless belt or chain 40, the latter being driven by a belt 42 operatively connecting a motor 43 to the pulley 35. The endless belt 40 carries clips 41 (see FIG. 8) receiving the sealed ampules 10. The endless belt 40 may be made of a resilient material or it may be in the fashion of a chain with connecting links 40a as shown in FIG. 8. The clips 41 may have resilient arms 41a with a narrow neck to hold the ampule and to facilitate their insertion and removal.

Supported on the frame 30 above the work bench 25 is a partial enclosure 44 having side walls 45 and 46 and an end wall 47. A fan 50 discharges a stream of air into the partial enclosure 44 to cool the ampules after they have emerged from the water.

The operation of this apparatus is as follows. An operator standing at the left hand side (FIG. 6) of the apparatus, places the ampules in the clips 42 carried on the moving belt 40, the latter, travelling in the direction indicated by the arrows, submerges the ampules in the water 26, and then carries them into enclosure 44 where they are cooled by the fan 50. The belt 40 returns the ampule 10 to the operating station in a cooled condition for removal by the operator who then places additional ampules in the vacated spaces. The top and left hand side (FIG. 6) of the enclosure 44 are open while the right hand side is closed by the end wall 47, the latter serving as a protective barrier in case any of the ampules should break after emerging from the water and before being cooled by the fan 50.

In addition to dissolving the plug, the heating also pressurizes the ampule thereby serving as a test of its integrity. Thus, if the ampule had a small crack or if it was not properly sealed, the chances are it would break when subjected to the increased pressure. The pressure in the ampule when heated to the aforesaid 165° F. may reach approximately 60 p.s.i. In normal use, it is not expected that the ampules will ever be exposed to a 165° F. temperature.

The ethylene oxide released upon breaking of any ampule during heating will react with the water 26 to form ethylene glycol without harmful or adverse effect. The belt 40 may be driven at a speed so as to submerge the ampules for thirty seconds in the aforesaid 165° water.

As previously mentioned the ampule 10 is initially filled with pure ethylene oxide. As shown in FIG. 9, this may be done by providing a cylinder 56 of ethylene oxide and pressurizing the latter with gas, for example dry nitrogen from cylinder 57, via a pressure regulator 58 and a control valve 59. A solenoid valve 60 controls the release of ethylene oxide to the delivery system indicated generally at 62, the latter comprising a delivery conduit 64, a dispensing solenoid valve 65 therein, a timer 66 operating the dispensing valve 65, a delivery spout 68 (e.g. a needle or small bore pipe), a heat exchanger 70, a pre-cooler 71, and a cooling means 72. The cooling means 72, which may consist of a conventional refrigeration system for cooling a liquid (e.g. anti-freeze), includes a pump 73 for circulating the cooled liquid via conduit 75 into the heat exchanger 70 to cool the ethylene oxide flowing through the delivery conduit 64. After passing from the heat exchanger, cooling fluid may be made to flow through the pre-cooler 71, to pre-cool the ethylene oxide before the latter enters the heat exchanger 70. The pre-cooler 71 may comprise tubes running along the sides of the delivery conduit 64 as illustrated in FIG. 9. The coolant fluid is continuously recirculated to the heat exchanger 70 and pre-cooler 71 via the conduits 75 and 76.

The cooling apparatus cools the ethylene oxide to prevent it from vaporizing or boiling upon being introduced into the ampule. The ethylene oxide may be cooled to approximately −5° F., well below its boiling point of approximately 50° F. at atmospheric pressure. An electrical interlock (not shown) may be provided to prevent dispensing of the ethylene oxide until the temperature of the latter in the delivery system has been reduced to at least −5° F.

A solenoid valve 78 in a line 79 leading to a safe discharge area (e.g. a sewer) releases the pressure in the delivery system 62 when the solenoid valve 60 is closed. This is a safety feature which insures complete isolation of the delivery system 62 in case of equipment failure such as the dispensing valve 65 being stuck or a pipe breaking in the delivery area. A safety valve 80 protects against excessive pressure.

In operation, a safety relay (not shown) supplies power to the timer 66 and the dispensing valve 65 when the system is in a safe condition. An operator at the filling station places the ampule to be filled over the dispensing needle 68 and activates a switch which starts the timer 66 and opens the dispensing valve 65. At the end of a predetermined period of time, the timer 66 closes the dispensing valve 65 and the ampule 10 is filled to the desired level.

By way of example, the ethylene oxide liquid in the delivery system may be placed under a pressure of approximately 35 p.s.i. by the dry nitrogen in tank 57. Thus, when the dispensing valve 65 is opened, liquid ethylene oxide will flow from the delivery system 62 into an ampule being filled, the ethylene oxide, of course, being cooled, as previously described, before it reaches the dispensing valve 65.

Once the ampule is filled to the correct level, the operator removes it from the dispensing needle 68 and seats the stopper 18 in the spout as previously described. The sterilant will remain at a sufficiently low temperature after being dispensed into the ampule to give the operator ample time to insert the stopper 18 before the liquid sterilant starts to vaporize to any great degree.

In the above description, the stoper 18 has been described as being made from polyvinyl chloride. An advantage of this material, apart from those already mentioned, is that it is resilient so that it can be compressed and snugly seated in the neck of the ampule. The hollow section 16a of the stopper 16 also adds to its overall resiliency.

In the above description, the stopper 16 was described as being inserted after the ampule was filled. Alternatively, the stoper 16 may be initially inserted and the ampule filled by piercing the stopper with a hollow bore cannula and passing the sterilant through the latter. The polyvinyl chloride stopper has sufficient self-sealing properties to seal the bore made by the cannula upon removal of the latter after the ampule has been filled. An example of a commercially available polyvinyl chloride which has been found satisfactory for use as a stopper is Geon–8854, a clear polyvinyl chloride made by B. F. Goodrich Chemical Co.

The above described use of an essentially saturated hydrocarbon for the stopper avoids the necessity of having to use other materials which might be adversely affected by, or which might adversely affect, the sterilant. For example, polymerization elements in some types of commercial grade rubber used for stoppers may adversely affect the ethylene oxide.

Figure 10:
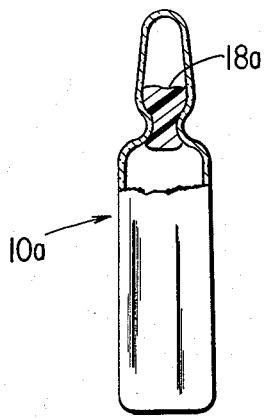
FIG. 10 is an elevation, partly broken away and in section, of an alternate embodiment in which an insoluble stopper is used with an ampule.

As a further alternate embodiment shown in FIG. 10, the essentially saturated hydrocarbon may be added to the ampule 10a in dry form prior to filling the ampule with cooled sterilant. An insoluble slug 18a (e.g. suitable rubber, polyethylene) is then placed in the ampule neck to act as a vapor barrier as the spout of the ampule is heat sealed. When the assembly is passed through the water bath (e.g. tank 24), the plug 18a will be displaced into the spout of the ampule 10a by the pressure of the gaseous phase of the sterilant in the body of the ampule, the hydrocarbon (e.g. polystyrene) being rapidly dissolved in the sterilant and the ampule pressure tested.

It will be understood that the present invention has broad application beyond that described above relating to gaseous sterilization. For example, anesthetics, previously mentioned, may be packaged in flame-sealed glass ampules using the method described herein. This would be less expensive than present known existing methods (e.g. canning), particularly where small quantities are involved. Further, an inexpensive, small, highly portable anesthesia machine may be made using the aforesaid anesthetics by adding to the latter, an appropriate essentially saturated hydrocarbon. The resulting compound would be used in conjunction with a semi-permeable membrane such that the rate of gas release, and hence the dose delivered to the patient, would be automatically controlled by the compounding agent and/or the membrane characteristics. An apparatus so constituted might be operated safely by personel not having the high skills and extensive knowledge required in known methods currently employed in anesthesia management.

In addition to the aforementioned substances, the invention might also be used for controlling the release of vapors as common as perfume or deodorizers.

From the above description, it will be evident that there has been described a method and apparatus for managing and controlling a volatile substance from the time it is delivered from a source to its ultimate release in gaseous form.

It will be understood that various changes may be made in the form, construction and arrangement of the several parts without departing from the spirit and scope of the invention and hence we do not intend to be limited to the details shown or described herein except as the same are included in the claims or may be required by disclosures of the prior art.

What we claim is:

1. The method of managing a volatile sterilant or anesthetic, comprising the steps of maintaining the sterilant or anesthetic below its boiling temperature, placing the sterilant or anesthetic in a rigid impermeable container along with a solid mass of a substantially saturated hydrocarbon, thereafter hermetically sealing said container, and thereafter subjecting the container to a temperature sufficient to dissolve the solid substantially saturated hydrocarbon in said sterilant or anesthetic, said hydrocarbon retarding the rate of vaporization of said sterilant or anesthetic upon subsequent release from the container during use.

2. The method of managing a volatile sterilant or anesthetic according to claim 1 further comprising the step of forming said solid mass of substantially saturated hydrocarbon as a closure member for said container.

3. The method of managing a volatile sterilant or anesthetic according to claim 2 wherein said container is an ampule having a spout in which said closure member is seated, said step of sealing said container comprising applying a source of heat to the spout to seal the latter, said closure member acting as a protective barrier between the volatile sterilant or anesthetic in the container and said source of heat.

4. The method of managing a volatile sterilant or anesthetic according to claim 3 wherein said sterilant or anesthetic is placed in said container prior to seating the closure member in said spout.

5. The method of managing a volatile sterilant or anesthetic according to claim 3 wherein said closure member has self-sealing properties, said sterilant or anesthetic being placed in the container after seating the closure member via a temporary opening made in said closure member which is subsequently closed due to the self-sealing properties of the closure member.

6. The method of managing a volatile sterilant or anesthetic according to claim 2 further comprising forming said closure member as a resilient stopper for said container.

7. The method of managing a volatile sterilant or anesthetic according to claim 2 further comprising forming said closure member with a hollow section thereby increasing its overall resiliency, and seating said closure member in said container with a rod-like tool fitting into said hollow section.

8. The method of managing a volatile sterilant or anesthetic according to claim 1 wherein said step of subjecting the container to a temperature sufficient to dissolve the substantially saturated hydrocarbon comprises submerging the container in a heated liquid which also serves to temporarily pressurize the container to test its integrity.

9. The method of managing a volatile sterilant or anesthetic according to claim 1 wherein said step of maintaining the sterilant or anesthetic below its boiling temperature comprises circulating a cooling fluid in heat exchange relationship with the sterilant or anesthetic being delivered to the container.

References Cited

UNITED STATES PATENTS

| | | | |
|---|---|---|---|
| 252,894 | 1/1882 | Otten | 53—264 |
| 1,011,988 | 12/1911 | Moeller | 53—4 |
| 1,096,797 | 5/1914 | Snelling. | |
| 1,613,962 | 1/1927 | Schworetzky | 73—52 |
| 1,991,938 | 2/1935 | Houghton. | |
| 2,370,768 | 3/1945 | Baerwald. | |
| 2,778,533 | 1/1957 | Savary | 53—140 X |
| 2,837,881 | 6/1958 | Schneider. | |
| 2,846,829 | 8/1958 | Eskin | 53—22 |
| 2,895,270 | 7/1959 | Blaess. | |
| 2,929,182 | 3/1960 | Silverstein | 53—39 |
| 3,308,599 | 3/1967 | Perlowski | 53—22 |
| 3,309,836 | 3/1967 | Hallowell | 53—39 |
| 2,917,878 | 12/1959 | Carnarius. | |
| 2,948,999 | 8/1960 | Schlayer. | |
| 3,016,284 | 1/1962 | Trexler. | |
| 3,043,067 | 7/1962 | Rynkiewicz. | |
| 3,343,331 | 9/1967 | French. | |
| 3,376,688 | 4/1968 | Takacs. | |
| 3,421,282 | 1/1969 | Hasegawa | 53—4 |
| 3,449,885 | 6/1969 | Starkey | 53—22 |

WAYNE A. MORSE, JR., Primary Examiner

U.S. Cl. X.R.

21—58; 53—39, 41, 43, 78, 140, 141; 73—52